US010539783B1

(12) United States Patent
Birch et al.

(10) Patent No.: US 10,539,783 B1
(45) Date of Patent: Jan. 21, 2020

(54) COMPRESSIVE SENSING OPTICAL DESIGN AND SIMULATION TOOL

(71) Applicant: National Technology & Engineering Solutions of Sandia, LLC, Albuquerque, NM (US)

(72) Inventors: Gabriel Carlisle Birch, Albuquerque, NM (US); Charles Fredrick LaCasse, IV, Albuquerque, NM (US); Amber Lynn Dagel, Albuquerque, NM (US); Jon D. Bradley, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 549 days.

(21) Appl. No.: 15/295,614

(22) Filed: Oct. 17, 2016

Related U.S. Application Data

(63) Continuation-in-part of application No. 15/295,356, filed on Oct. 17, 2016, now Pat. No. 10,387,660.

(51) Int. Cl.
*G06F 17/50* (2006.01)
*G02B 27/00* (2006.01)
(Continued)

(52) U.S. Cl.
CPC ..... *G02B 27/0012* (2013.01); *G06F 17/5009* (2013.01); *G06T 7/0004* (2013.01);
(Continued)

(58) Field of Classification Search
CPC ..... G06T 11/006; G06T 5/003; G06K 9/6807; G02B 21/365; G02B 13/06; G02B 21/14;
(Continued)

(56) References Cited

U.S. PATENT DOCUMENTS

| | | | | |
|---|---|---|---|---|
| 7,328,059 | B2 * | 2/2008 | Sevick-Muraca | A61B 5/0059 600/431 |
| 9,432,591 | B2 * | 8/2016 | Brady | G02B 13/06 |

(Continued)

OTHER PUBLICATIONS

F. Armknecht, R. Maes, A. Sadeghi, O.-X. Standaert, and C. Wachsmann. A formalization of the security features of physical functions. 2011 IEEE Symposium on, pp. 397-412. In Security and Privacy (SP), May 2011.

(Continued)

*Primary Examiner* — Kandasamy Thangavelu
(74) *Attorney, Agent, or Firm* — Daniel J. Jenkins

(57) ABSTRACT

A system or method for designing optical systems includes generating a mathematical model of an imaging system; tracing a plurality of light rays from a source through the model of the imaging system in a forward direction and a backward direction incident upon an arbitrarily defined detector location; calculating the total light rays incident upon the arbitrarily defined detector location in response to the plurality of light rays; tracing a series of calibration images first through the computational or compressive imager mathematical model; measuring an output set of parameters based on a plurality of detected rays calibration images at the defined detector location; storing the output set of parameters in software, and determining an estimated system transfer function.

20 Claims, 3 Drawing Sheets

(51) Int. Cl.
*G06T 7/80* (2017.01)
*G06T 7/00* (2017.01)

(52) U.S. Cl.
CPC ............ *G06T 7/80* (2017.01); *G06F 2217/16* (2013.01); *G06T 2207/30108* (2013.01)

(58) Field of Classification Search
CPC .. G02B 26/06; G02B 21/008; G02B 27/0075; G01N 21/47; G01N 15/1484; H04N 13/128; A61B 5/02416; A61B 5/0059; G01S 13/387; G01K 11/006; G21K 7/00
See application file for complete search history.

(56) References Cited

U.S. PATENT DOCUMENTS

| | | | | |
|---|---|---|---|---|
| 9,594,019 | B1* | 3/2017 | Ludwig | G01N 15/1484 |
| 9,892,812 | B2* | 2/2018 | Zheng | G21K 7/00 |
| 10,136,116 | B2* | 11/2018 | Tosic | H04N 13/128 |
| 2006/0204861 | A1* | 9/2006 | Ben-Eliezer | G02B 27/0075 430/5 |
| 2008/0219579 | A1* | 9/2008 | Aksyuk | G02B 26/06 382/248 |
| 2011/0142316 | A1* | 6/2011 | Wang | G06T 11/006 382/131 |
| 2013/0257646 | A1* | 10/2013 | Gopalsami | G01K 11/006 342/179 |
| 2013/0335256 | A1* | 12/2013 | Smith | G01S 13/887 342/22 |
| 2014/0204385 | A1* | 7/2014 | Ouyang | G01N 21/47 356/445 |
| 2015/0077583 | A1* | 3/2015 | Szapiel | G06T 5/003 348/222.1 |
| 2015/0309300 | A1* | 10/2015 | Higaki | G02B 21/14 348/79 |
| 2016/0048963 | A1* | 2/2016 | Piestun | G06K 9/6807 382/154 |
| 2016/0097716 | A1* | 4/2016 | Gulati | A61B 5/02416 250/339.01 |
| 2016/0231549 | A1* | 8/2016 | Bosworth | G02B 21/008 |
| 2017/0146787 | A1* | 5/2017 | Reed | G02B 21/365 |
| 2017/0287118 | A1* | 10/2017 | Crowe | G06T 5/003 |

OTHER PUBLICATIONS

T. Bauer and J. Hamlet. Physical unclonable functions: A primer. IEEE, 12(6):97-101, Security Privacy, Nov. 2014.
Mark A. Davenport, Marco F Duarte, YC Eldar, and G. Kutyniok. Introduction to compressed sensing. In Compressed Sensing: Theory and Applications. Cambridge University Press, 2011.
Rob Fergus, Antonio Torralba, and William T Freeman. Random lens imaging. 2006.
J. Guajardo, S.S. Kumar, G.-J. Schrijen, and P. Tuyls. Physical unclonable functions and public-key crypto for FPGA IP protection. International Conference on, pp. 189-195, Aug. 2007. In Field Programmable Logic and Applications, 2007. FPL 2007.
Roarke Horstmeyer, Benjamin Judkewitz, Ivo M Vellekoop, SID Assawaworrarit, and Changhuei Yang. Physical key-protected one-time pad. Scientific Reports, 3, 2013.
D. Lim, J.W. Lee, B. Gassend, G.E. Suh, M. Van Dijk, and S. Devadas. Extracting secret keys from integrated circuits. Very Large Scale Integration (VLSI) Systems, IEEE Transactions on, 13(10):1200-1205, Oct. 2005.
A. Maiti, J. Casarona, L. Mchale, and P. Schaumont. A large scale characterization of RO-PUF. In Hardware-Oriented Security and Trust (HOST), 2010 IEEE International Symposium on, pp. 94-99, Jun. 2010.
G.E. Sufi and S. Devadas. Physical unclonable functions for device authentication and secret key generation. In Design Automation Conference, 2007. DAC '07. 44th ACM/IEEE, pp. 9-14, Jun. 2007.
Meng-Day Yu and S. Devadas. Secure and robust error correction for physical unclonable functions. Design Test of Computers, IEEE, 27(1):48-65, Jan. 2010.
Gabriel Birch, "Computational and Design Methods for Advanced Imaging"; Dissertation, U. of Arizona College of Optical Sciences, 2012.

* cited by examiner

COMPRESSIVE SENSING OPTICAL DESIGN AND SIMULATION TOOL

CROSS-REFERENCE TO RELATED PATENT APPLICATIONS

This patent application is a Continuation-in-Part of co-pending, commonly-owned patent application Ser. No. 15/295,356, filed Oct. 17, 2016, entitled COMPUTATIONAL OPTICAL PHYSICALLY UNCLONABLE FUNCTION (COPUF), which is hereby incorporated by reference.

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention.

BACKGROUND OF THE INVENTION

The application generally relates to a system and method for compressive sensing (CS), or computational imaging, optical design. The application relates more specifically to software methods that enable the design and evaluation of computational imaging systems and compressive sensing imaging systems.

Design tools that enable exploration of CS system performance are lacking in the art. One possible reason for the lack of design tools may be the enormous computational resources required for designing a CS system. Generally, millions of ray paths must be computed and then repeated for thousands of different configurations to attain a single system transfer function which can be used to evaluate traditional optical system performance metrics. The disclosed methods and systems utilizes a graphics processing unit (GPU) based raytracing technique to parallelize the simulation process, enabling reasonable simulation times and tools closer to that of traditional optical design.

Existing computational or compressive imaging systems rely upon highly abstracted models of imaging components, and do not provide a computational/compressive imaging system transfer function of a realistic system. The proposed method relies upon non-sequential raytracing, and realistic models of imaging components. Our novel method captures realistic and complex behavior of both the optics and opto-mechanics.

Traditional optical design tools, e.g., OpticStudio software by Zemax, LLC of Kirkland, Wash., or FRED software, have been used to simulate the intermediate images produced by a computational or compressive imager. However, these design tools utilize CPU based raytracers, which can require seconds to produce a single usable image in the calibration data set. CPU based raytrace techniques are insufficient for optical system design applications such as optimization, genetic algorithms, or simulated annealing. Computational or compressive imaging systems can take thousands or tens of thousands of simulated calibration output images to enable robust solutions when solving for the system transfer function.

What is needed is a system and/or method for rapidly testing and evaluating optical designs of computational and compressive imaging sensing (CS) systems. The term compressive sensing (CS) is used interchangeably with computational imaging, for purposes of this disclosure.

BRIEF SUMMARY OF THE INVENTION

One embodiment relates to a simulation method for designing optical systems that includes: generating a mathematical model of an imaging system; tracing a plurality of light rays from a source through the model of the imaging system in a forward direction and a backward direction incident upon an arbitrarily defined detector location; calculating the total light rays incident upon the arbitrarily defined detector location in response to the plurality of light rays; tracing a series of calibration images first through the computational or compressive imager mathematical model; measuring an output set of parameters based on a plurality of detected rays calibration images at the defined detector location; storing the output set of parameters in software, and determining a system transfer function.

Another embodiment relates to a simulation method for designing optical systems includes generating a mathematical model of an imaging system; tracing a plurality of light rays from a source through the model of the imaging system in a forward direction and a backward direction incident upon an arbitrarily defined detector location; calculating the total light rays incident upon the arbitrarily defined detector location in response to the plurality of light rays; tracing a series of calibration images first through the computational or compressive imager mathematical model; measuring an output set of parameters based on a plurality of detected rays calibration images at the defined detector location; storing the output set of parameters in software, and determining a system transfer function; processing a plurality of simulated test images; applying the model of the imaging system to the plurality of simulated test images; tracing the plurality of simulated test images via the mathematical model; storing the simulated set of test images in software; applying the system transfer function to a plurality of simulated test images output from the tracing step; and reconstructing the plurality of simulated test images.

Yet another embodiment discloses A non-transitory computer-readable storage medium having stored thereon instructions which, when executed by one or more processing units, cause the one or more processing units to perform a method for simulation of a computational imaging system, including: generating a mathematical model of an imaging system; tracing a plurality of light rays from a source through the model of the imaging system in a forward direction and a backward direction incident upon an arbitrarily defined detector location; calculating the total light rays incident upon the arbitrarily defined detector location in response to the plurality of light rays; tracing a series of calibration images first through the computational or compressive imager mathematical model; measuring an output set of parameters based on a plurality of detected rays calibration images at the defined detector location; storing the output set of parameters in software; determining a system transfer function; and developing a merit function from one or more user defined features.

The disclosed method provides a GPU-based raytrace system that utilizes parallel calculating capabilities to dramatically reduce the time required to simulate the calibration and test images needed to evaluate the performance of a computational or compressive imaging system. The present method provides performance gains well over one hundred times faster than existing CPU-based optical design software simulations.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
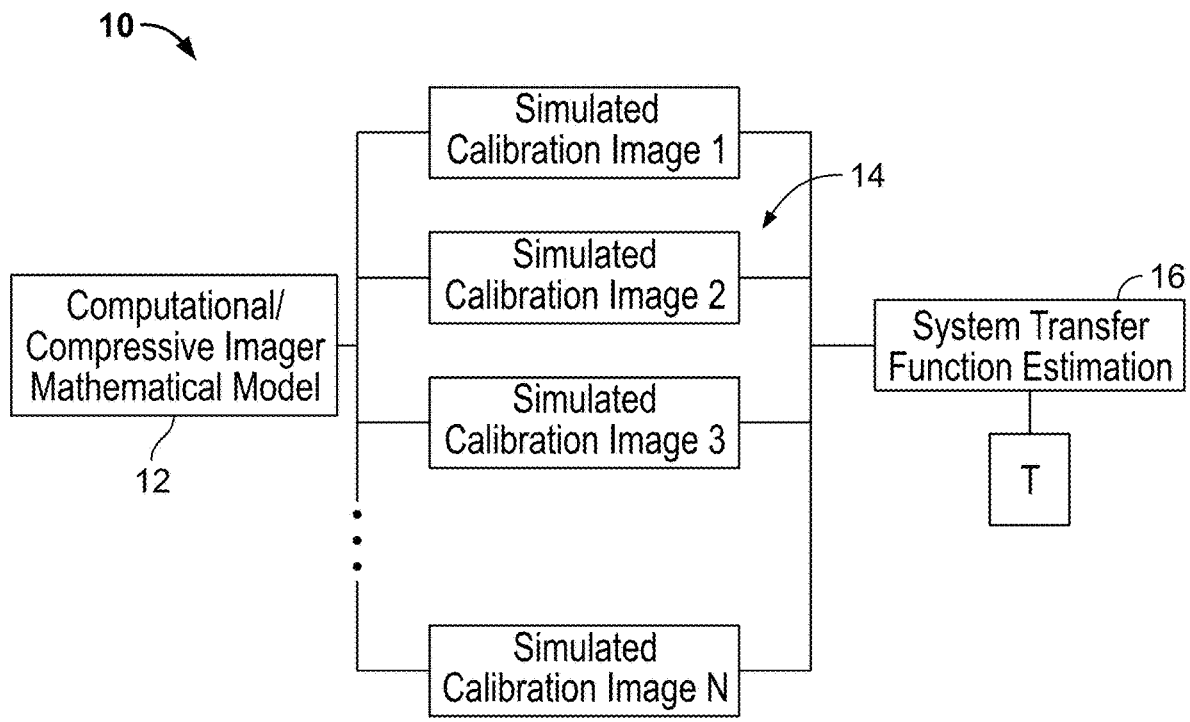
FIG. 1 shows a first phase of a computational or compressive imaging system transfer function for an optical device simulation.

Referring to FIG. 1, a first phase 10 of a simulated computational or compressive imaging system transfer function is described. At step 12, a mathematical model of a computational or compressive imaging system is generated. The model may include both physical surface models, e.g., models utilized in a random scatterer, or mathematically defined parametric optical systems, e, g, spherical or parabolic lenses or mirrors. Mathematically defined elements may include, without limitation, a mathematically defined surface model may include, without limitation, a refracting element, a reflecting element, a diffracting element, spatially variant absorbing elements, a polarization element, a non-linear element, a spatially varying retardance element, a stochastically defined scattering element, a fluorescence element, or other similar mathematically defined surface models. A source of emitted photons, or rays, is simulated and defined in the computational or compressive imaging system mathematical model. The photon source may include a flat plane of parallel rays, converging rays, diverging rays, or a complex lightfield representative of a scene of interest. Rays are then traced through the system in forward or backward directions. The total rays incident upon an arbitrarily defined detector location are calculated in response to the source rays.

At step 14, a series of calibration images 1 through N, are first raytraced through the computational or compressive imager mathematical model. These calibration images may include, but are not limited to, e.g., Hadamard pseudo-random patterns, random binary patterns, or raster scanned single pixels. At step 16, the measured output of calibration images 1 through N, is collected in software, and a mathematical solver takes the known calibration inputs and measured calibration outputs to determine an estimated system transfer function, T.

Figure 2:
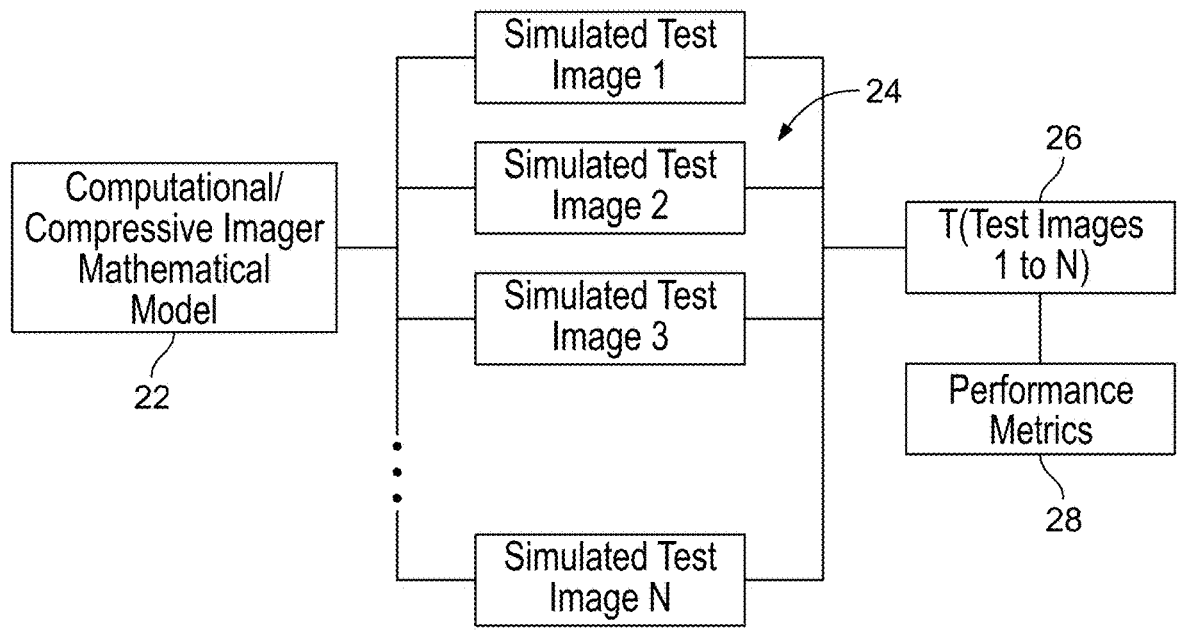
FIG. 2 shows a second phase of a computational or compressive imaging system transfer function for an optical device simulation.

Referring next to FIG. 2, a set of simulated test images is similarly processed. At step 22, the computational or compressive imager mathematical model from step 12 (FIG. 1), is applied to an arbitrary set of test images. The arbitrary set of simulated test images 1 through N is raytraced via the mathematical model and a simulated set of test images is then collected in software at step 24. Transfer function T is then applied to the simulated test image outputs (step 24) to reconstruct the original test images at step 26. These reconstructed images are then processed with user-defined techniques to create performance metrics at step 28. Examples of user-defined techniques may include evaluation of reconstructed image noise, evaluation of system reconstructed image resolution, or evaluation of element sensitivity to wedge or decenter. Performance metrics provide quantitative evaluation of the performance of the computational or compressive imaging system, in a manner similar to that of traditional optical design. Exemplary evaluations using performance metrics may include tolerancing analyses, thermal expansion effects on reconstructed image quality, or best detector location to maximize system reconstructed image resolution. Additional descriptions of exemplary optical engineering evaluations may be found, e.g., in "Modern Optical Engineering", W. Smith's Ch. 11.

Figure 3:
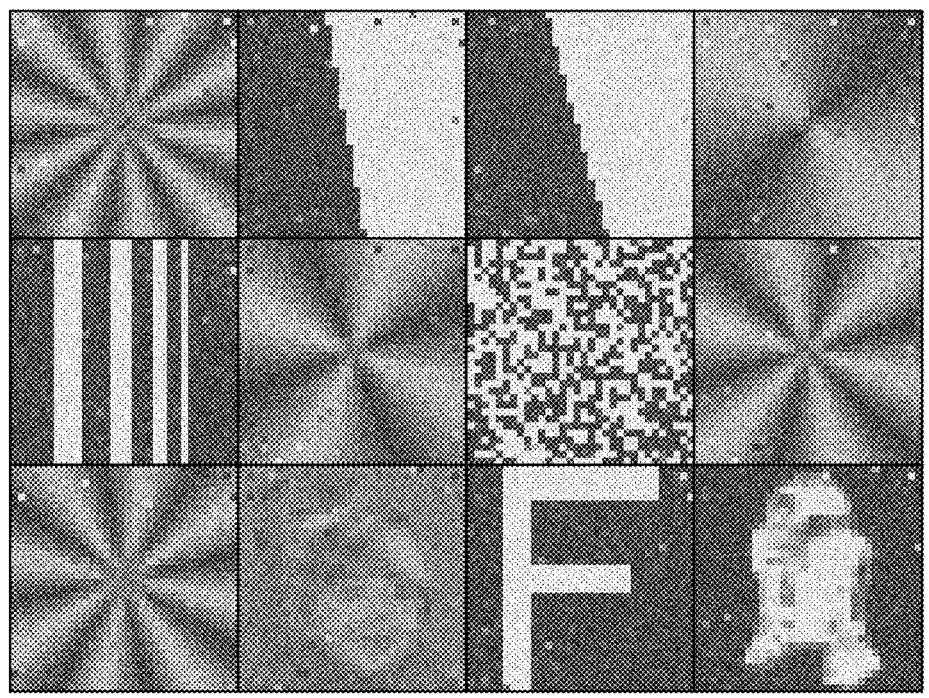
FIG. 3 shows exemplary reconstructed simulated test images from the computational or compressive imaging system transfer function.

Referring next to FIG. 3, various exemplary reconstructed simulated test images are shown, after applying the system transfer function T to simulated test images that are ray-traced through the computational/compressive imaging device. Optical test images, e.g., the sinusoidal Siemens star, slanted edge, or swept bar target can be used to evaluate system performance metrics.

As shown in FIG. 3, exemplary test images 32 can be reconstructed via raytracing techniques, and the performance of the computational/compressive imaging device can be characterized or evaluated using arbitrary user specifications as described above with respect to FIG. 2. In this particular example, it is possible to directly measure the reconstructed computational/compressive imager modulation transfer function using the sinusoidal Siemens star test targets.

The method described above first simulates the 'intermediate,' datasets produced by a computational or compressive imaging system. Known inputs 34 (FIG. 4), e.g., images, and measured outputs of the calibration image simulation process 10 are then passed to a mathematical solver. In one embodiment the transfer function solver procedure will be to measure the system response function, which is described in Equation 1:

$$B_{Measured\ Data} = TX_{scene} \quad \text{[Equation 1]}$$

where B is the measured data, T is the system response, and X is the scene to be measured. The system response function describes how the detector will respond to an arbitrary scene. The system response can be measured by displaying a series of know scenes, such as those depicted in FIG. 4.

An example technique to find the system response is as follows: Assume that the pixel response will be calculated on a per detector pixel basis, using a stack of input scenes that is k long. The data reduction can be performed by arranging the input scenes into an array A that is of size n×k, where n is the number of input pixels and k is the number of input scenes. B becomes a vector of size k, and T is the system response matrix that maps the response of the single detector pixel from each input pixel n, so it is a column vector of length n. The response matrix for pixel I can be found by solving the Equation 2:

$$A*T_i - B_i = 0 \qquad [\text{Equation 2}]$$

using data reduction methods. Examples of data reduction methods may include, e.g., least squares or basis pursuit algorithms.

Figure 4:
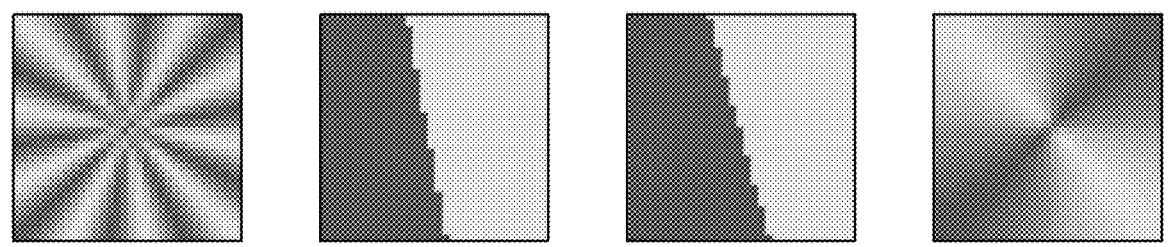
FIG. 4 shows the known inputs corresponding to the reconstructed simulated test images in FIG. 3.
Figure 4:
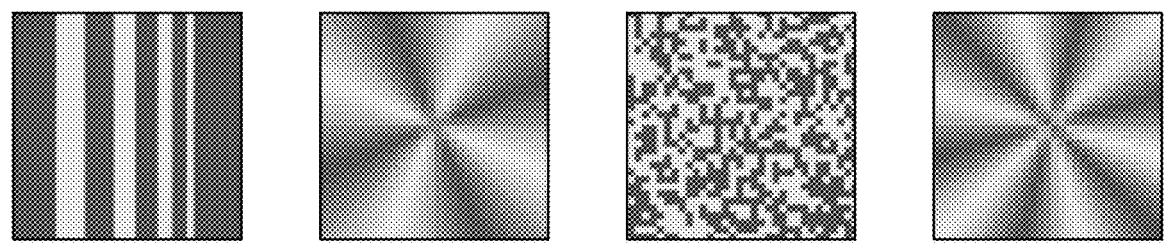
Figure 4:
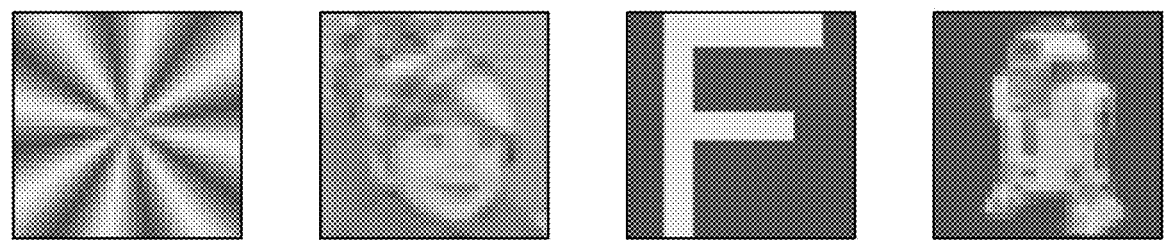

Once transfer function T is estimated, arbitrary intermediate test images may be reconstructed to estimate the original test image. The optical transfer function T is independent of the image input to the system. Rather, the system transfer function is inherent in the physical properties of the imaging system. Therefore, a standardized calibration method can be utilized to estimate the entire system transfer function, which can then be applied to arbitrary test images. FIG. 4 shows the known inputs 34 corresponding to the reconstructed images shown in FIG. 3.

The application for the disclosed methods includes Computational Optical Physically Unclonable Function (COPUF) simulations 20 (FIG. 5), as well as other applications. One exemplary application includes the use of the transfer function to evaluate a computational imager performance in terms of traditional optical design metrics. E.g., the transfer function may determine how sensitive a computational imager is to decenter (i.e., displacement) of a particular element and apply that information to redesign the optical system to be less sensitive, or use the data to specify mechanical tolerances to maintain the sensitive optical element within the acceptable tolerance.

The system transfer function can also be applied to evaluate a set of metrics to determine imager quality. A merit function can then be constructed based on the determined metrics and an optimization algorithm can be utilized to mathematically search for a computational or compressive imager that maximizes performance. This process is essential for modern optical design. The proposed method overcomes difficulties in the prior art and provides full system simulations traditional optical design techniques for computational and compressive imagers.

Some optimization techniques include the utilization of least-squares minimization, or simulated annealing. Simulated annealing on a simulated COPUF enables a computer code to modify the random scatterer and maximize image quality in the reconstructed images.

Figure 5:
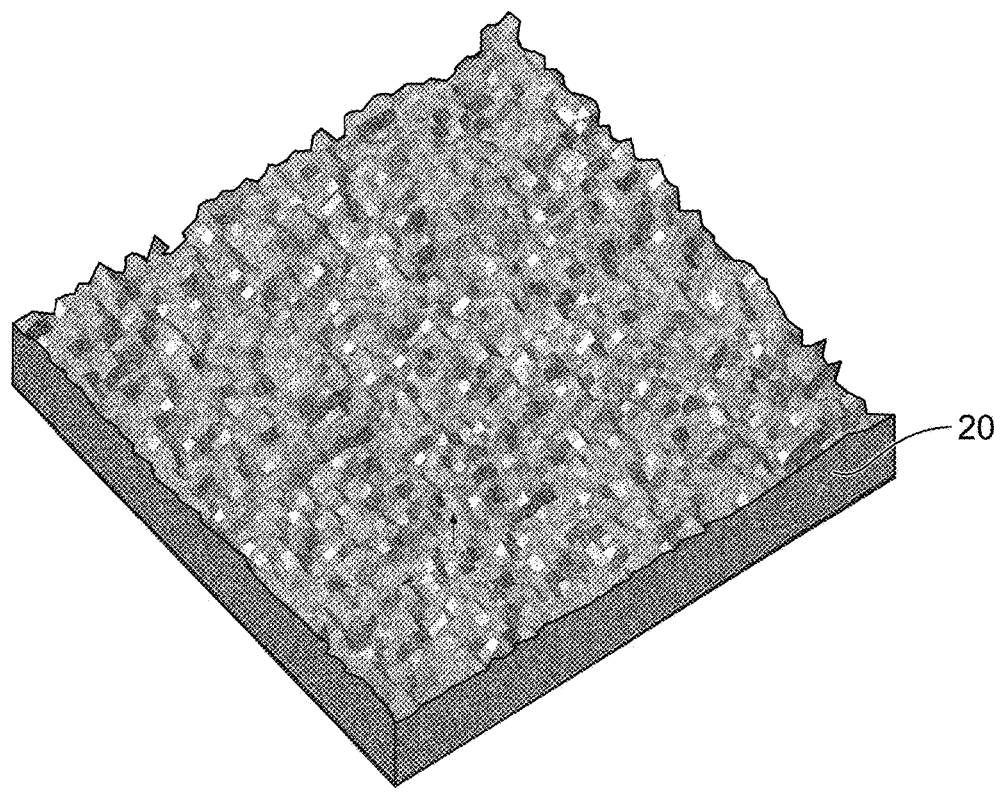
FIG. 5 shows a rectangular object with a surface map altered by a random binary mask according to an embodiment of the disclosure.
Figure 6:
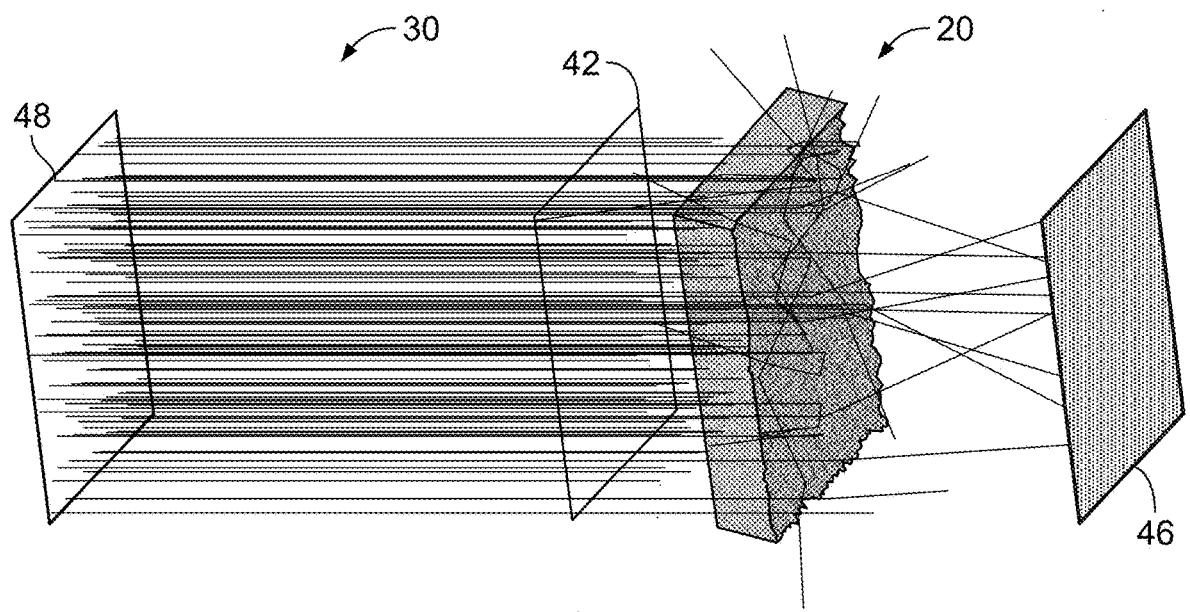
FIG. 6 shows non-sequential raytrace abilities to simulate a fully functioning COPUF according to an embodiment of the disclosure.

Referring next to FIGS. 5 and 6, when a pattern 48 is displayed on light source 42, photons emanating light source 42 are scattered by random optical element 44, and intensity is measured at corresponding array points on detector 46. Calibration measurements are performed to determine the original message displayed by LCD source 42, whereby known patterns are displayed by the LCD and images of the resulting scattered photons are acquired by detector 46. Using minimization techniques based on computational sensing techniques or algorithms, a transfer function between an object, i.e., the random optical element 44, and image, i.e., the resulting collection of photons on detector 46 after photons from the object pass through the optical element 44, may be estimated, or reconstructed, to establish a transfer function $T_{AB}$. Transfer function $T_{AB}$ captures the random but fixed scattering nature of the random optical element 44. Transfer function $T_{AB}$ may be computed, e.g., via a general purpose computer or other microprocessor-based device having embedded software (not shown). A compressive sensing algorithm is a class of minimization solvers. In one embodiment a compressive sensing technique or a general minimization algorithm may be used to establish transfer function $T_{AB}$.

Referring to FIG. 5 a COPUF system 30 may be simulated system utilizing Matlab, Zemax non-sequential raytrace simulations, and Blender to generate three dimensional (3D) random scattering surfaces. In one exemplary embodiment a 3D modeling program such as Blender 3D open source modeling program may be used to generate a rectangle object with a surface map altered by a random binary mask, to generate a random scattering surface with gross surface features as shown in FIG. 5. The virtual object is then exported into a common 3D model format, and imported into an optical raytrace program, e.g., Zemax an optical system design program, to create traditional imaging systems.

Referring next to FIG. 6, non-sequential raytrace abilities may be used to simulate a fully functioning COPUF. In the exemplary embodiment simulation is defined by the ability of a user to specify a pattern of interest, which passes through the random scattering surface exported from the 3D model, and then is incident on a detector.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon.

Such machine-readable media can be any available media which can be accessed by a general purpose or special purpose computer or other machine with a processor. By way of example, such non-transitory machine-readable media can comprise RAM, ROM, EPROM, EEPROM, CD-ROM or other optical disk storage, magnetic disk storage or other magnetic storage devices, or any other non-transitory computer-readable medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a non-transitory machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A computer implemented method for designing optical systems comprising:
generating a mathematical model of an imaging system;
tracing, using a computer, a plurality of light rays from a source through the model of the imaging system in a forward direction or a backward direction incident upon an arbitrarily defined detector location;
calculating, using the computer, total light rays incident upon the arbitrarily defined detector location in response to the plurality of light rays;
tracing, using the computer, a series of calibration images through a computational imaging system mathematical model or a compressive imaging system mathematical model using the total light rays incident upon the arbitrarily defined detector location;
calculating, using the computer, an output set of parameters based on a plurality of detected rays or calibration images at the arbitrarily defined detector location;
storing the output set of parameters in memory;
determining, using the computer, a system transfer function used to design an optical system using the output set of parameters; and
designing, using the computer, a computational imaging or a compressive imaging optical system using the determined system transfer function.

2. The method of claim 1, further comprising processing a plurality of simulated test images.

3. The method of claim 2, further comprising applying the model of the imaging system to the plurality of simulated test images; tracing the plurality of simulated test images via the mathematical model;
storing the simulated set of test images in memory;
applying the system transfer function to a plurality of simulated test images output from the tracing step; and
reconstructing the plurality of simulated test images.

4. The method of claim 1, further comprising processing the plurality of reconstructed simulated test images to create at least one performance metric.

5. The method of claim 1, wherein the at least one performance metric provides a quantitative evaluation of the performance of the computational imaging system or compressive imaging system.

6. The method of claim 1, wherein the imaging system comprises a computational imaging system.

7. The method of claim 1, wherein the imaging system comprises a compressive imaging system.

8. The method of claim 1, wherein the step of generating comprises simulating a source of emitted photons, or rays.

9. The method of claim 8, wherein the step of generating further comprises defining the computational imaging system mathematical model or compressive imaging system mathematical model.

10. The method of claim 1, wherein the source is a photon source comprising one of: a flat plane of parallel rays; converging rays; diverging rays; and a complex lightfield representative of a scene of interest.

11. The method of claim 1, wherein the calibration images comprise one of: a Hadamard pseudo-random pattern, a random binary patterns, and a raster scanned single pixels.

12. A computer implemented method for designing optical systems comprising:
generating a mathematical model of an imaging system;
tracing, using a computer, a plurality of light rays from a source through the model of the imaging system in a forward direction and a backward direction incident upon an arbitrarily defined detector location;
calculating, using the computer, total light rays incident upon the arbitrarily defined detector location in response to the plurality of light rays;
tracing, using the computer, a series of calibration images through a computational imaging system mathematical model or a compressive imaging system mathematical model;
calculating, using the computer, an output set of parameters based on a plurality of detected rays or calibration images at the arbitrarily defined detector location;
storing the output set of parameters in memory;
determining, using the computer, a system transfer function;
processing, using the computer, a plurality of simulated test images;
applying, using the computer, the model of the imaging system to the plurality of simulated test images;
tracing, using the computer, the plurality of simulated test images via the mathematical model;
storing the simulated set of test images in memory;
applying, using the computer, the system transfer function to a plurality of simulated test images output from the tracing step;
reconstructing, using the computer, the plurality of simulated test images to design an optical system; and
designing, using the computer, a computational imaging or a compressive imaging optical system using the reconstructed plurality of simulated test images.

13. The method of claim 12, further comprising applying a mathematical solver to a plurality of calibration inputs and the measured calibration outputs to determine the transfer function.

14. The method of claim 13, wherein the model comprises physical surface models.

15. The method of claim 14 wherein the physical surface models comprise models utilized in a random scatterer.

16. The method of claim 13 wherein the physical surface model comprises a mathematically defined parametric optical system.

17. The method of claim 16 wherein the optical system is selected from the group consisting of: a spherical lens, a parabolic lens, a spherical mirror, a parabolic mirror, a refracting element, a reflecting element, a diffracting element, a spatially variant absorbing element, a polarization element, a non-linear element, a spatially varying retardance element, a stochastically defined scattering element, and a fluorescence element.

18. A non-transitory computer-readable storage medium having stored thereon instructions which, when executed by one or more processing units in a computer, cause the one or more processing units to perform a method for designing a computational imaging or a compressive imaging optical system, comprising:

generating a mathematical model of an imaging system;

tracing a plurality of light rays from a source through the model of the imaging system in a forward direction and a backward direction incident upon an arbitrarily defined detector location;

calculating the total light rays incident upon the arbitrarily defined detector location in response to the plurality of light rays;

tracing a series of calibration images through a computational imaging system mathematical model or a compressive imaging system mathematical model;

calculating an output set of parameters based on a plurality of detected rays or calibration images at the defined detector location;

storing the output set of parameters in memory;

determining a system transfer function; and developing a merit function from one or more user defined features; and designing a computational imagine or a compressive image optical system using the system transfer function and merit function.

19. The medium of claim 18, further comprising searching for a computational imaging system or a compressive imaging system that maximizes performance of the merit function, and basing the merit function on a set of predetermined metrics and an optimization algorithm.

20. The medium of claim 19, further comprising: the optimization algorithm utilizing least-squares minimization or simulated annealing.

* * * * *